United States Patent
Gunnarsson et al.

(10) Patent No.: US 11,051,271 B2
(45) Date of Patent: Jun. 29, 2021

(54) LOCATION INFORMATION IN COMMUNICATIONS NETWORK

(71) Applicant: Telefonaktiebolaget LM Ericsson (publ), Stockholm (SE)

(72) Inventors: Fredrik Gunnarsson, Linköping (SE); Erik Eriksson, Linköping (SE); Pål Frenger, Linköping (SE); Martin Hessler, Linköping (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/924,558

(22) Filed: Jul. 9, 2020

(65) Prior Publication Data

US 2020/0344713 A1 Oct. 29, 2020

Related U.S. Application Data

(63) Continuation of application No. 14/773,989, filed as application No. PCT/SE2015/050808 on Jul. 8, 2015.

(51) Int. Cl.
*H04W 72/00* (2009.01)
*H04W 64/00* (2009.01)
(Continued)

(52) U.S. Cl.
CPC .......... *H04W 64/003* (2013.01); *G01S 1/042* (2013.01); *G01S 1/20* (2013.01); *G01S 5/0236* (2013.01);
(Continued)

(58) Field of Classification Search
CPC ......... H04W 4/02; H04W 4/14; H04W 48/04; H04W 64/00
(Continued)

(56) References Cited

U.S. PATENT DOCUMENTS

2006/0267841 A1  11/2006  Lee
2007/0159971 A1   7/2007  Zhang et al.
(Continued)

FOREIGN PATENT DOCUMENTS

CN    104662436 A   5/2015
JP    2009528546 A  8/2009
(Continued)

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.5.0, Vlarch 2015, pp. 1-136.
(Continued)

*Primary Examiner* — Matthew W Genack
(74) *Attorney, Agent, or Firm* — Murphy, Bilak & Homiller, PLLC (57) ABSTRACT

There is provided mechanisms for providing location information in a communications network. A method is performed by a first device. The first device supports positioning of other devices in the communications network. The method comprises acquiring positioning reference signal configuration from a radio network node in the communications network. The method comprises acquiring location information from a local positioning entity. The method comprises providing the location information to at least one of a radio network node and a second device in the communications network. The method comprises transmitting a positioning reference signal according to the positioning reference signal configuration.

16 Claims, 8 Drawing Sheets

(51) Int. Cl.
*G01S 1/04* (2006.01)
*G01S 5/02* (2010.01)
*G01S 1/20* (2006.01)
*H04W 4/02* (2018.01)
*H04W 72/04* (2009.01)

(52) U.S. Cl.
CPC ........... *G01S 5/0289* (2013.01); *H04W 4/027* (2013.01); *H04W 72/048* (2013.01); *H04W 64/00* (2013.01)

(58) Field of Classification Search
USPC ................ 455/414.2, 456.1–456.6, 457, 466
See application file for complete search history.

(56) References Cited

U.S. PATENT DOCUMENTS

| | | | |
|---|---|---|---|
| 2007/0184864 A1* | 8/2007 | Leitch | H04W 52/0219 455/507 |
| 2010/0182910 A1 | 7/2010 | Norefors et al. | |
| 2010/0232330 A1 | 9/2010 | Cheng et al. | |
| 2011/0117926 A1* | 5/2011 | Hwang | H04W 64/00 455/456.1 |
| 2012/0040687 A1 | 2/2012 | Siomina et al. | |
| 2012/0176270 A1 | 7/2012 | Shin | |
| 2012/0184287 A1* | 7/2012 | Jovicic | H04W 64/00 455/456.1 |
| 2013/0116908 A1 | 5/2013 | Oh et al. | |
| 2013/0190009 A1 | 7/2013 | Johansson et al. | |
| 2014/0162669 A1* | 6/2014 | Dahlen | H04W 48/18 455/450 |
| 2014/0349677 A1 | 11/2014 | Xiao et al. | |
| 2015/0139005 A1 | 5/2015 | Tsuboi et al. | |
| 2015/0365790 A1 | 12/2015 | Edge et al. | |

FOREIGN PATENT DOCUMENTS

| | | |
|---|---|---|
| JP | 2012524906 A | 10/2012 |
| JP | 2013101100 A | 5/2013 |
| JP | 2017505426 A | 2/2017 |
| RU | 2013111840 A | 9/2014 |
| WO | 2004070997 A2 | 8/2004 |
| WO | 2010124011 A2 | 10/2010 |
| WO | 2015088812 A2 | 6/2015 |

OTHER PUBLICATIONS

Gustafsson, Fredrik, et al., "Mobile Positioning Using Wireless Networks", IEEE Signal Processing Magazine, Jul. 2005, pp. 41-53.

Radnosrati, Kamiar, et al., "New Trends in Radio Network Positioning", International Conference on Information Fusion, Washington DC, USA, Jul. 2015, pp. 1-7.

Unknown, Author, "3rd Generation Partnership Project; Technical Specification Group Radio Access Network; Evolved Universal Terrestrial Radio Access Network (E-UTRAN); Stage 2 Functional Specification of User Equipment (UE) Positioning in E-UTRAN (Release 12)", 3GPP TS 36.305 V12.2.0, Dec. 2014, 4 pages.

* cited by examiner

LOCATION INFORMATION IN COMMUNICATIONS NETWORK

RELATED APPLICATIONS

This application is a continuation of U.S. application Ser. No. 14/773,989 filed 9 Sep. 2015, which is a U.S. National Phase Application of PCT/SE2015/050808 filed 8 Jul. 2015. The entire contents of each aforementioned application is incorporated herein by reference.

TECHNICAL FIELD

Embodiments presented herein relate to communications networks, and particularly to methods, devices, computer programs, and a computer program product for providing location information in a communications network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is beam forming. It may further be advantageous for devices in the communications network to have low energy consumption.

To reduce energy consumption in the communications network and to fully enable utilizing high gain beam forming or other multi-antenna techniques it has been envisioned that the control/broadcast layer can be separated from the data plane.

In general terms, the control layer, also denoted the system control plane (SCP), is responsible for functions related to random access and paging in the communications network. To reduce network energy consumption broadcasted signals may by network nodes, such as radio access network nodes, in the communications network be transmitted more infrequently than in legacy reference signals in cellular systems. However, it is envisioned that such infrequent transmission of broadcast signals may not be network node-specific as in legacy communications network. An idle mode wireless device would then not be able to identify individual network nodes prior to network attach.

That the wireless device would not be able to identify individual network nodes prior to network attach could imply that the wireless device would not be able to perform positioning. In some scenarios, the deployed network infrastructure is thus insufficient for positioning. For example, the network infrastructure can be gradually established, or only deployed to support communication needs but not adhering to positioning needs. One example is construction sites, where the environment changes organically over time, and where the communication needs may change over time as well. Another example is mines where the infrastructure of the mine is changing over time, and the need for positioning is much localized to where work is currently conducted. Yet another example is a warehouse building where there may be some basic positioning needs at some locations in the building, and where there simultaneously may be some stricter positioning needs (of people and goods) near vessels operating in the building.

In some such cases, positioning can still rely on external signals and systems such as the Global Navigation Satellite System (GNSS), and the network infrastructure may only provide benefits in terms of provisioning of assistance data to facilitate signal retrieval. However, GNSS availability may be limited in the area of consideration, and the devices to be positioned may lack the capability of retrieving GNSS signals.

Further, in some other cases, there is adequate positioning available from the deployed network infrastructure in parts of the service area, but not all.

Hence, there is still a need for improved mechanisms for providing and obtaining location information in a communications network.

SUMMARY

An object of embodiments herein is to provide efficient mechanisms for providing and obtaining location information in a communications network.

According to a first aspect there is presented a method for providing location information in a communications network. The method is performed by a first device. The first device supports positioning of other devices in the communications network. The method comprises acquiring positioning reference signal configuration from a radio network node in the communications network. The method comprises acquiring location information from a local positioning entity. The method comprises providing the location information to at least one of a radio network node and a second device in the communications network. The method comprises transmitting a positioning reference signal according to the positioning reference signal configuration.

Advantageously this provides efficient provision of location information in a communications network.

Advantageously this allows some devices, such as the first device, that populate an area to act as flexible reference points, and thereby provide positioning support to other devices, such as the second device, in the area. By enabling network control, the communications network can control positioning availability. The first device can inform the network node about their capabilities, possible also triggered once they are adequately self-positioned. Thereby, it is possible to support positioning in environments and use cases which organically grow and change over time.

According to a second aspect there is presented a device for providing location information in a communications network. The device supports positioning of other devices in the communications network. The device comprises processing circuitry. The processing circuitry is configured to cause the device to perform a set of operations. The set of operations causes the device to acquire positioning reference signal configuration from a radio network node in the communications network. The set of operations causes the device to acquire location information from a local positioning entity. The set of operations causes the device to providing the location information to at least one of a radio network node and a second device in the communications network. The set of operations causes the device to transmit a positioning reference signal according to the positioning reference signal configuration.

According to a third aspect there is presented a computer program for providing location information in a communications network, the computer program comprising computer program code which, when run on processing circuitry of a device, causes the device to perform a method according to the first aspect.

According to a fourth aspect there is presented a method for a second device to obtain positioning information in a communications network. The method is performed by the second device. The method comprises acquiring positioning assistance information by receiving location information of a first device, the first device supporting positioning of other devices in the communications network, the location information thereby serving as said positioning assistance information for the second device. The method comprises receiving a positioning reference signal from the first device, the positioning reference signal being received according to positioning reference signal configuration. The method comprises performing at least one of a first set of operations and a second set of operations. The first set of operations comprises estimating characteristic properties from the received positioning reference signal. The first set of operations comprises reporting the estimated characteristic properties and an association thereof with the first device to a network node in the communications network. The second set of operations comprises determining a current position of the second device according to the received positioning assistance information.

Advantageously this provides efficient obtaining of location information in a communications network.

According to a fifth aspect there is presented a device for obtaining positioning information in a communications network. The device comprises processing circuitry. The processing circuitry is configured to cause the device to perform a set of operations. The set of operations causes the device to acquire positioning assistance information by receiving location information of another device, the another device supporting positioning of other devices in the communications network, the location information thereby serving as said positioning assistance information for the device. The set of operations causes the device to receive a positioning reference signal from this another device, the positioning reference signal being received according to positioning reference signal configuration. The set of operations causes the device to perform at least one of a first set of operations and a second set of operations. The first set of operations comprises estimating characteristic properties from the received positioning reference signal. The first set of operations comprises reporting the estimated characteristic properties and an association thereof with the first device to a network node in the communications network. The second set of operations comprises determining a current position of the second device according to the received positioning assistance information.

According to a sixth aspect there is presented a computer program for obtaining positioning information in a communications network, the computer program comprising computer program code which, when run on processing circuitry of a device, causes the device to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
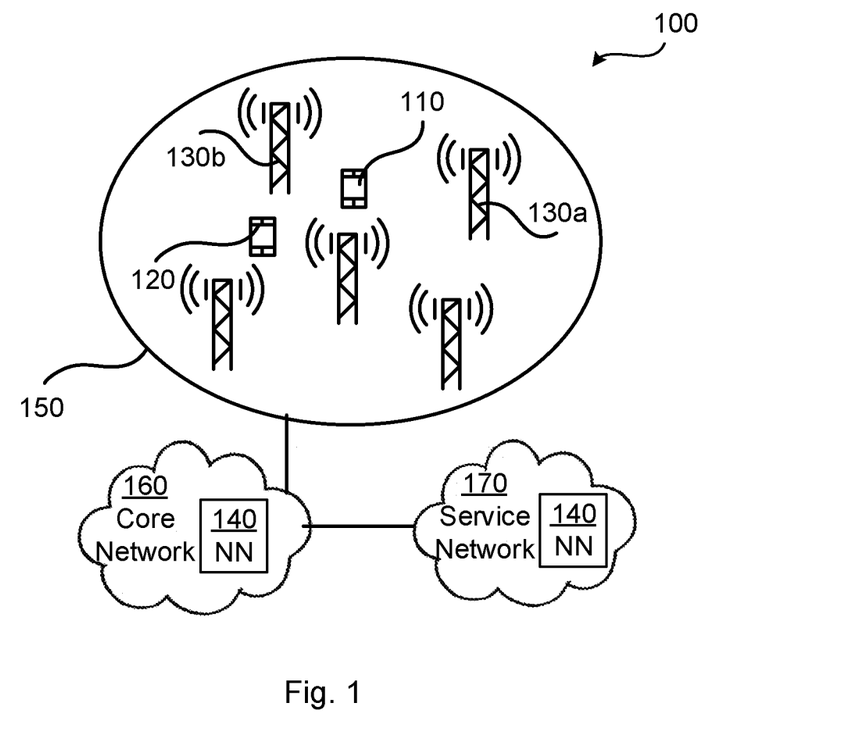
FIG. 1 is a schematic diagram illustrating a communication network according to embodiments.

FIG. 1 is a schematic diagram illustrating a communications network 100 where embodiments presented herein can be applied. The communications network 100 comprises radio network nodes 130a, 130b. Each radio network node 130a, 130b provides one or more cells 150 for a device 110, 120 to camp on. The radio network nodes 130a, 130b are operatively connected to a core network 160 which, in turn, is operatively connected to a service network 170. A device 110, 120 camping on a cell 150 of one of the radio network nodes 130a, 130b may thereby be able to access content and services as provided by the service network 170.

The communications network 100 may comprise a network nodes (NN) 140. The network node 140 may be provided in the core network 160 or in the service network 170. In general terms the network node 140 may be configured to monitor devices 110, 120 in an area, for example to keep track of the location of devices 110, 120 in the area, or to keep track of devices 110, 120 in relation to other devices 110, 120 to avoid collisions.

The radio network nodes 130a, 130b may be provided as any combination of radio access network nodes such as radio base stations, base transceiver stations, node Bs, and evolved node Bs. The devices 110, 120 may be provided as a portable wireless device such as a mobile station, a mobile phone, a handset, a wireless local loop phone, a user equipment (UE), a smartphone, a laptop computer, a tablet computer, or a wireless sensor device.

The following definitions will be useful for the description of the herein disclosed embodiments.

The term positioning may be defined as a determination of the whereabouts of a device. Positioning of a device can be estimated based on signals from infrastructure nodes and devices.

The term location may be defined as referring to whereabouts of a piece of infrastructure. In view of the herein disclosed embodiments, the first device 110 is part of the positioning infrastructure, and therefore it is relevant to consider the location of the first device 110. The location of the first device 110 can be determined via positioning The term positioning reference signal may be defined as any type of signal conveyed by infrastructure nodes and devices to support positioning. Further, the positioning reference signal may comprise an identity of the first device 110. The positioning reference signal may be defined as in Long Term Evolution (LTE) release 9.

The term location information may be defined as the location of the first device 110 as specified in a message transmitted to either a network node or another device, such as the second device 120. Thus, the location information may define a current location of the first device 100. An identifier of the first device 110 can also be considered as an example of location information.

The term positioning assistance information may be defined as information to a device about one or more infrastructure nodes and devices, comprising the positioning reference signal configuration and optionally the location information of the node/device.

Embodiments disclosed herein relate to providing positioning information in a communications network 100. In order to provide positioning information in a communications network there is provided a device 110 denoted a first device, a method performed by the first device 110, a computer program comprising code, for example in the form of a computer program product, that when run on processing circuitry of the first device, causes the first device to perform the method.

Further embodiments disclosed herein relate to obtaining positioning information in a communications network 100. In order to obtain positioning information in a communications network there is provided a device 120 denoted a second device, a method performed by the second device 120, and a computer program comprising code, for example in the form of a computer program product, that when run on processing circuitry of the second device 120, causes the second device 120 to perform the method.

Figure 2A:
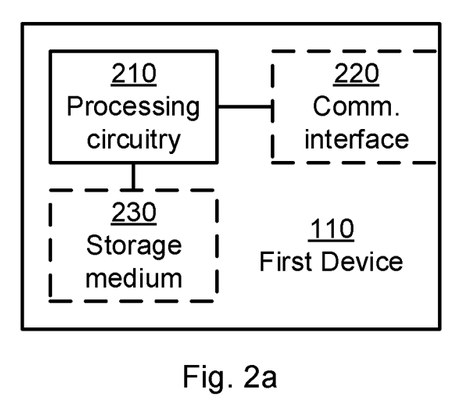
FIG. 2a is a schematic diagram showing functional units of a first device according to an embodiment.

FIG. 2a schematically illustrates, in terms of a number of functional units, the components of a first device 110 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410a (as in FIG. 4), e.g. in the form of a storage medium 230.

Particularly, the processing circuitry 210 is configured to cause the first device 110 to perform a set of operations, or steps, S102-S124. These operations, or steps, S102-S124 will be disclosed below. For example, the storage medium 230 may store the set of operations, and the processing circuitry 210 may be configured to retrieve the set of operations from the storage medium 230 to cause the first device 110 to perform the set of operations. The set of operations may be provided as a set of executable instructions. Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory.

The first device 110 may further comprise a communications interface 220 for communications with other devices and nodes 120, 130a, 130b, 140 in the communications network 100. As such the communications interface 220 may comprise one or more transmitters and receivers, comprising analogue and digital components and a suitable number of antennas for wireless communications. The processing circuitry 210 controls the general operation of the first device 110 e.g. by sending data and control signals to the communications interface 220 and the storage medium 230, by receiving data and reports from the communications interface 220, and by retrieving data and instructions from the storage medium 230. Other components, as well as the related functionality, of the first device 110 are omitted in order not to obscure the concepts presented herein.

Figure 2B:
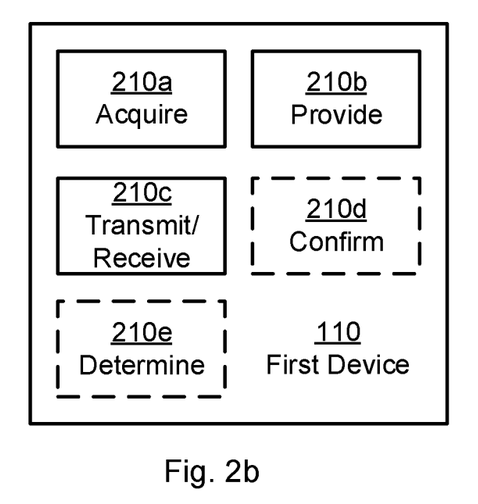
FIG. 2b is a schematic diagram showing functional modules of a first device according to an embodiment.

FIG. 2b schematically illustrates, in terms of a number of functional modules, the components of a first device 110 according to an embodiment. The first device 110 of FIG. 2b comprises a number of functional modules; an acquire module 210a configured to perform below steps S102, S104, S104a, S114, a provide module 210b configured to perform below steps S106, S112, S116, S120, S124, and a transmit and/or receive module 210c configured to perform below steps S108, S110, S122. The first device 110 of FIG. 2b may further comprises a number of optional functional modules, such as any of a confirm module 210d configured to perform below step S118, and a determine module 210e configured to perform below step S104b. The functionality of each functional module 210a-210e will be further disclosed below in the context of which the functional modules 210a-210e may be used. In general terms, each functional module 210a-210e may be implemented in hardware or in software. Preferably, one or more or all functional modules 210a-210e may be implemented by the processing circuitry 210, possibly in cooperation with functional units 220 and/or 230. The processing circuitry 210 may thus be arranged to from the storage medium 230 fetch instructions as provided by a functional module 210a-210e and to execute these instructions, thereby performing any steps as will be disclosed hereinafter.

Figure 3A:
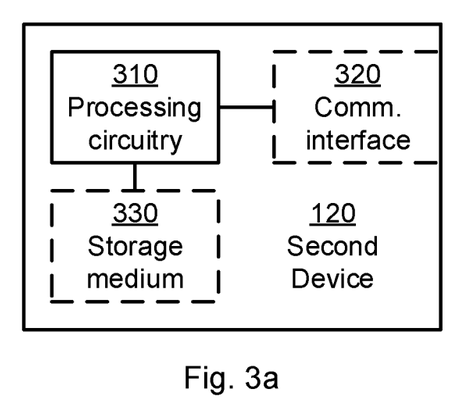
FIG. 3a is a schematic diagram showing functional units of a second device according to an embodiment.

FIG. 3a schematically illustrates, in terms of a number of functional units, the components of a second device 120 according to an embodiment. Processing circuitry 310 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410b (as in FIG. 4), e.g. in the form of a storage medium 303.

Particularly, the processing circuitry 310 is configured to cause the second device 120 to perform a set of operations, or steps, S202-S216. These operations, or steps, S202-S216 will be disclosed below. For example, the storage medium 330 may store the set of operations, and the processing circuitry 310 may be configured to retrieve the set of operations from the storage medium 330 to cause the second device 120 to perform the set of operations. The set of operations may be provided as a set of executable instructions. Thus the processing circuitry 310 is thereby arranged to execute methods as herein disclosed. The storage medium 330 may also comprise persistent storage, which, for example, can be any single one or combination of magnetic memory, optical memory, solid state memory or even remotely mounted memory.

The second device 120 may further comprise a communications interface 32 for communications with other devices and nodes 110, 130a, 130b, 140 in the communications network 100. As such the communications interface 320 may comprise one or more transmitters and receivers, comprising analogue and digital components and a suitable number of antennas for wireless communications. The processing circuitry 310 controls the general operation of the second device 120 e.g. by sending data and control signals to the communications interface 320 and the storage medium 330, by receiving data and reports from the communications interface 320, and by retrieving data and instructions from the storage medium 330. Other components, as well as the related functionality, of the second device 120 are omitted in order not to obscure the concepts presented herein.

Figure 3B:
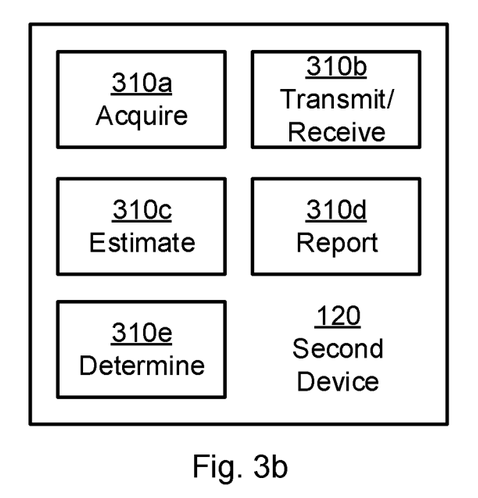
FIG. 3b is a schematic diagram showing functional modules of a second device according to an embodiment.

FIG. 3b schematically illustrates, in terms of a number of functional modules, the components of a second device 120 according to an embodiment. The second device 120 of FIG. 3b comprises a number of functional modules; an acquire module 310a configured to perform below steps S202, S204, a transmit and/or receive module 310b configured to perform below steps S202a, S206, S214, S216, an estimate module 310c configured to perform below step S208, a report module 310d configured to perform below step S210, and a determine module 310e configured to perform below step S212. The functionality of each functional module 310a-310e will be further disclosed below in the context of which the functional modules 310a-310e may be used. In general terms, each functional module 310a-310e may be implemented in hardware or in software. Preferably, one or more or all functional modules 310a-310e may be implemented by the processing circuitry 310, possibly in cooperation with functional units 320 and/or 330. The processing circuitry 310 may thus be arranged to from the storage medium 330 fetch instructions as provided by a functional module 310a-310e and to execute these instructions, thereby performing any steps as will be disclosed hereinafter.

Figure 4:
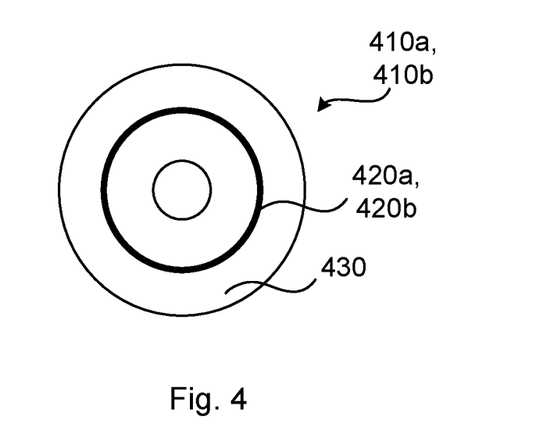
FIG. 4 shows one example of a computer program product comprising computer readable means according to an embodiment.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the first device 110 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the second device 120 as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

Figures 5, 6:
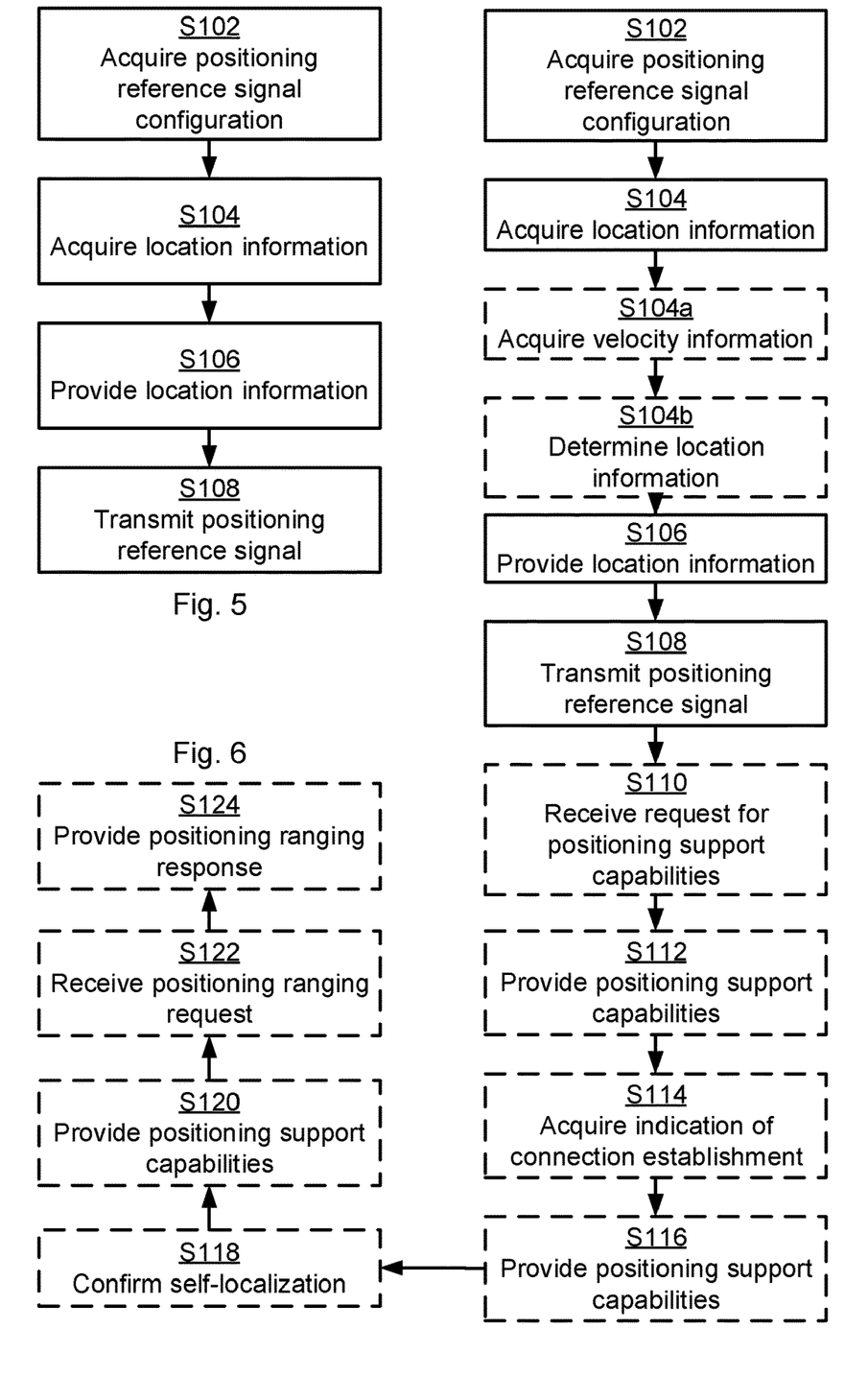
FIGS. 5, 6, 7, 8, 9, and 10 are flowcharts of methods according to embodiments.
Figure 7:
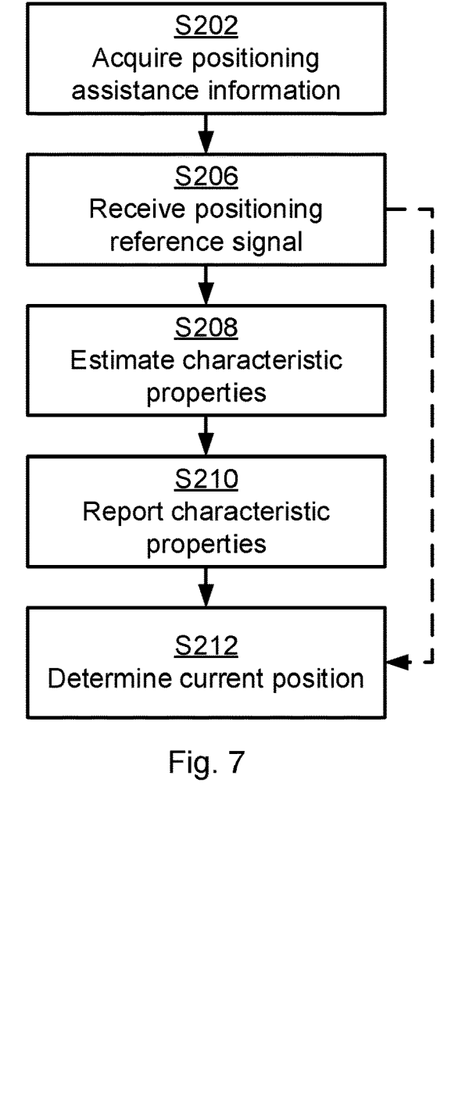
Figure 8:
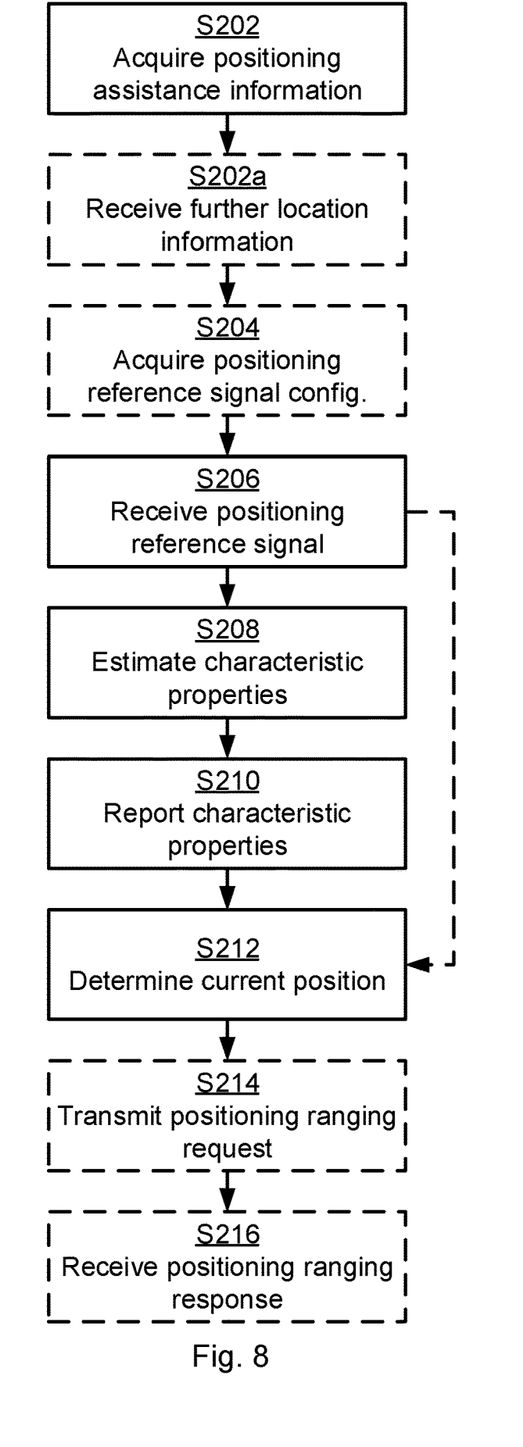

FIGS. 5 and 6 are flow charts illustrating embodiments of methods for providing location information in a communications network 100 as performed by the first device 110. FIGS. 7 and 8 are flow charts illustrating embodiments of methods for obtaining positioning information in a communications network 100 as performed by the second device 120. The methods are advantageously provided as computer programs 42a, 42b.

Reference is now made to FIG. 5 illustrating a method for providing location information in a communications network 100 as performed by the first device 110 according to an embodiment. The first device 110 supports positioning of other devices 120, 130b, 140 in the communications network 100.

In general terms, a first device 100 in the communications network 100 is associated to the capability of provisioning of positioning reference signals. This enables that a second device 120 configured to monitor and measure retrieved positioning reference signals from the first device 110 may either determine position utilizing positioning assistance information from the communications network 100, or to report measurements associated to the positioning reference signals to a network node, which may be a radio network node 130a, 130b or a network node 140 outside the radio access network part of the communications network 100.

The first device 110 is configured to, in a step S102, acquire positioning reference signal configuration from a radio network node 130a in the communications network 100. Examples of positioning reference signal configuration and how the first device 110 may communicate with the radio network node 130a will be provided below.

The first device 110 is configured to, in a step S104, acquire location information from a local positioning entity. Examples of location information and local positioning entities will be provided below.

The first device 110 is configured to, in a step S106, provide the location information to a radio network node 130b and/or a second device 120 in the communications network 100. Examples how the first device 110 may communicate with the radio network node 130b and/or the second device 120 will be provided below.

The first device 110 is configured to, in a step S108, transmit a positioning reference signal according to the positioning reference signal configuration. Examples of the positioning reference signal will be provided below.

The thus disclosed mechanism for providing location information in a communications network 100 takes advantage of devices, such as the first device 110, with specific capabilities such as an ability to localize themselves, and the ability to transmit positioning reference signals, thereby facilitating positioning of other devices, such as the second device 120, in the network.

Embodiments relating to further details of providing location information in a communications network 100 will now be disclosed.

The first device 110 may be capable of determining its location either in absolute terms or relative to observed features. The positioning support capability of the first device 110 concerns its ability to obtain self-localization; since the first device 110 is considered to be part of the positioning infrastructure, its whereabouts is referred to as its location, see above.

The first device 110 may be configured with a communications interface 220 and processing circuitry 210 capable to determine its location information by retrieving positioning reference signals from radio network nodes 130a, 130b, as in step S102, possibly supported by assistance information from a network node 140.

The first device 110 may be configured with a communications interface 220 and processing circuitry 210 capable to determine its location information based on ranging estimates by exchanging packets with radio network nodes 130a, 130b, possibly supported by assistance information from a network node 140.

The first device 110 may be configured with sensors such as visual and infrared cameras, radars, ultrasound sensors, and other sensors and systems aiming at determining the location information of the first device 110, optionally in relation to identified objects and features or in relation to map information, possibly supported by assistance information from a network node 140.

Further, there may be different examples of local positioning entities from which the first device 110 may acquire location information as in step S104. For example, the local positioning entity may be a Global Navigation Satellite System (GNSS), a Global Positioning System (GPS), a Global Navigation Satellite System (GLONAS), a BeiDou Navigation Satellite System (BDS), or a Galileo supported entity. In order to acquire location information from the local positioning entities the communications interface 220 and the processing circuitry 210 should thus be configured to receive and process information transmitted by such a local positioning entity. For example, if the local positioning entity is the Global Positioning System, the first device 110 may be equipped with a GPS navigation device for receiving location information from a GPS satellite, and so on. That is, the first device 110 may be configured with a communications interface 220 and processing circuitry 210 capable to determine its location information by using GPS information, possibly assisted by a network node 140. Further details of how the first device 110 should be configured to communicate with such local positioning entities is known in the art and a detailed description thereof is therefore omitted.

As noted above, the first device 110 is configured to receive positioning reference signal configuration from a radio network node 130a in the communications network 100. There may be different kinds of positioning reference signal configuration. Different embodiments relating thereto will now be described in turn. For example, the positioning reference signal configuration can be similar to the positioning reference signals defined for LTE, separated in a sequence and a resource mapping in 3GPP TS 36.211. This will be further described below.

In general terms, the positioning reference signal (PRS) configuration may comprise one or more of a PRS sequence configuration indicating what sequence to generate to realize the positioning signal, a PRS resource pattern configuration describing how to map a PRS sequence onto resource elements within resource blocks of the transmitted signal, a PRS time/frequency resource block configuration, determining which resource blocks that shall be used for transmission of the PRS, a PRS beam configuration characterizing the antenna weight configuration of the first device 110 for positioning reference signal transmission, a PRS general availability and restricted availability configuration, a positioning ranging request reception and response transmission configuration to enable other devices, such as the second device 120 to exchange messages with the first device 110 for ranging purposes.

Thus, the positioning reference signal configuration may specify sequence configuration, resource pattern configuration, time/frequency resource block configuration, beam configuration for how the first device is to transmit the positioning reference signal, or any combination thereof.

Different devices 110, 120 may have different capabilities regarding which PRS configurations it supports. Therefore, optionally, the first device 110 and/or the second device 120 may indicate its capabilities regarding PRS configurations as part of the signaling with a network node 130a, 130b, 140.

Reference is now made to FIG. 6 illustrating methods for providing location information in a communications network 100 as performed by the first device 110 according to further embodiments.

In addition to acquiring location information from a local positioning entity as in step S104 the first device 110a may take advantage of auxiliary information for determining the location information. For example, the first device 110a may take advantage of velocity information, such as a velocity magnitude and direction, or a velocity separated into coordinate components, available from components associated to the first device 110. The velocity information includes indications of the first device 110 being in motion as well as being stationary. Hence, according to an embodiment the first device 110 is configured to, in a step S104a, acquire velocity information of the first device 110. In turn, the velocity information may be based on a sequence of measurements acquired from the local positioning entity The first device 110 may then be configured to, in a step S104b, determine the location information based on the velocity information.

The first device 110 may be configured to signal capabilities of positioning support to a radio network node 130a or other network node 140. Different embodiments relating thereto will now be described in turn.

The transmission of a position reference signal in step S108 may be accompanied by support for reception of positioning ranging request messages and transmission of positioning ranging response messages. One embodiment is therefore based on the first device 110 signalling capabilities of positioning support to the radio network node 130a on demand. According to this embodiment the first device 110 is configured to, in a step S110, receive, from the network node 140, a request for positioning support capabilities of the first device 110. The first device 110 is then configured to, in response thereto, in a step S112, provide the positioning support capabilities to the network node 140.

One embodiment is based on the first device 110 signalling capabilities of positioning support to the radio network node 130a on connection establishment. According to this embodiment the first device 110 is configured to, in a step S114, acquire an indication of connection establishment to the radio network node 130a. How to establish a connection between the first device 110 and a radio network node 130*a* is as such known in the art and a detailed description thereof is therefore omitted. The first device 110 is then configured to, in response thereto, in a step S116, provide positioning support capabilities of the first device 110 to the radio network node 130*a*.

The first device 110 may optionally provide such capability information to a network node 140. In more detail, when the first device 110 has obtained updated or new location information, it may send the location information to a network node, for example as part of the capability information for positioning support sent to the network node 140. One embodiment is therefore based on the first device 110 signalling capabilities of positioning support to a network node 140 once the first device 110 is adequately self-localized. According to this embodiment the first device 110 is configured to, in a step S118, confirm that the first device is self-localized. The first device 110 is then configured to, in response thereto, in a step S120, provide positioning support capabilities of the first device 110 to the network node 140.

As will be disclosed below, the second device 120 may transmit a positioning ranging request to the first device 110. Therefore, according to an embodiment, the first device 110 is configured to, in a step S122, receive a positioning ranging request from another device in the communications network 100. The first device 110 may then be configured to, in response thereto, in a step S124, provide a positioning ranging response to the another device. This another device may be the second device 120. However, it may generally be any device or node in the communications network 100 from with the capability of transmitting such a positioning ranging request.

There may be different ways for the first device 110 to communicate with the network node 140, the radio network nodes 130*a*, 130*b*, and the second device 120, respectively. Different examples relating thereto will now be described in turn.

For example, all messages between the first device 110 and the network node 140 may be control plane messages or user plane positioning protocol messages. Examples of such protocols are LPP (the LTE Positioning Protocol), and SUPL (the Secure User Plane Location).

For example, all messages between the first device 110 and the radio network nodes 130*a*, 130*b* may be Radio Resource Control (RRC) protocol messages or Medium Access Control (MAC) protocol messages.

For example, all messages between the first device 110 and the second device 120 may be sidelink protocol messages. Additionally or alternatively, once the first device 110 has obtained updated or new location information, it may send the location information to the second device 120 via regular broadcast or on demand (for example using sidelink protocol messages).

For example, the positioning reference signal may in step S108 be transmitted via a downlink resource in a time division duplex configuration, via an uplink resource in a time division duplex configuration, via an uplink resource in a frequency division duplex configuration (one example is a sidelink resource configured for communication between devices), or via a sidelink resource in general, configured for positioning support purposes.

Reference is now made to FIG. 7 illustrating a method for obtaining positioning information in a communications network 100 as performed by the second device 120 according to an embodiment.

The second device 120 is configured to, in a step S202, acquire positioning assistance information. The positioning assistance information is acquired by the second device 120 receiving location information of a first device 110. The location information thereby serves as the positioning assistance information for the second device 120. As noted above, the first device 110 supports positioning of other devices 120, 130*b*, 140 in the communications network 100. The positioning assistance information may be acquired from a network node 140 or a radio network node 130*a*, 130*b* in the communications network 100 or even from the first device 110 itself.

As noted above, the first device 110 is configured to, in step S108, transmit a positioning reference signal. This positioning reference signal is, at least according to the present embodiment, assumed to be received by the second device 120. The second device 120 is therefore configured to, in a step S206, receive a positioning reference signal from the first device 110. The positioning reference signal is by the second device 120 received according to positioning reference signal configuration.

The second device 120 is further configured to perform a first set of operations S208, S210 and/or a second set of operations S212. These sets of operations will be disclosed next.

In order to perform the first set of operations the second device 120 is configured to, in a step S208, estimate characteristic properties from the received positioning reference signal. Examples of such characteristic properties and how they may be estimated will be provided below.

In order to perform the first set of operations the second device 120 is further configured to, in a step S210, report the estimated characteristic properties and an association thereof with the first device to a network node 140 in the communications network. Examples of how the second device 120 may communicate with the network node 140 will be provided below.

In order to perform the second set of operations the second device 120 is configured to, in a step S212, determine a current position of the second device 120. The current position of the second device 120 is determined according to the received positioning assistance information. Examples of how the second device 120 may determine a current position will be provided below.

Embodiments relating to further details of obtaining location information in a communications network 100 will now be disclosed.

As noted above, the second device 120 is further configured to perform a first set of operations S208, S210 and/or a second set of operations S212. The second device 120 may be configured to select which set of operations to perform based on configuration information.

There may be different kinds of characteristic properties. For example, the characteristics may relate to the identity associated to the positioning reference signal, time of arrival of the received positioning reference signal, received signal strength of the received positioning reference signal, estimated range of the received positioning reference signal, or any combination thereof.

There may be different kinds of positioning assistance information. For example, the positioning assistance information may comprise information about at least one infrastructure node or and device in the communications network 100. For example, the positioning assistance information may comprise the positioning reference signal configuration. For example, the positioning assistance information may comprise the location information of the second device 120.

For example, the positioning assistance information may comprise the beam direction associated to the positioning reference signal, optionally also the beam width.

There may be different kinds of positioning determination algorithms to determine the position of the second device 120, depending on the availability and characteristic properties measurements of the positioning reference signals. Typically, each such measurement, denoted $y_k$, k=1, . . . , K, where K is the number of measurements, is associated to a model that includes the unknown position p of the second device 120 and a known position associated to a positioning reference signal $p_k$. The model may also include a model error $e_k$ to describe the expected error in the model, for example an additive error:

$$y_k = h(p, p_k) + e_k,$$

where h is a measurement function representing either distance, time of arrival (TOA), time difference of arrival (TDOA), round trip time (RTT), angle of arrival (AOA), received signal strength (RSS), digital map information, or position estimates for its input arguments p and pk. There are other alternative models that are not based on additive errors.

The position of the second device may be determined as the position $\hat{p}$ that best explains the measurements, for example in the least squares sense:

$$\hat{p} = \underset{p}{\operatorname{argmin}} \sum_k (y_k - h(p, p_k))^2$$

where 'arg min' means the minimizing argument. Further details regarding different suitable positioning determination algorithms and measurement functions h are provided in Gustafsson, F.; Gunnarsson, F., "Mobile positioning using wireless networks: possibilities and fundamental limitations based on available wireless network measurements," Signal Processing Magazine, IEEE, vol. 22, no. 4, pp. 41-53, July 2005, doi: 10.1109/MSP.2005.1458284 as well as in Radnosrati, K.; Gunnarsson, F.; Gustafsson, F., "New Trends in Radio Network Positioning," proceedings of the International Conference on Information Fusion, Washington D.C., USA, July 2015.

Reference is now made to FIG. 8 illustrating methods for obtaining positioning information in a communications network 100 as performed by the second device 120 according to further embodiments.

As noted above, the second device 120 in step S202 receives location information from the first device 110. However, the second device 120 may additionally receive further location information from another device or node in the communications network 100. According to an embodiment the second device 120 is therefore further be configured to, in a step S202a, receive further location information from a network node 140 or radio network node 130a, 130b in the communications network 100.

In order for the second device 120 to be able to receive the positioning reference signal according to positioning reference signal configuration the second device 120 should be configured to access such positioning reference signal configuration. The positioning reference signal configuration may be stored in the storage medium 330 or be acquired from another device or node in the communications network 100 (prior to receiving the positioning reference signal in step S206). According to an embodiment the second device 120 is configured to, in a step S204, acquire the positioning reference signal configuration from a network node 140 or radio network node 130a, 130b in the communications network 100.

The second device 120 may request positioning ranging information from the first device 110. Such positioning ranging information may further be processed by the second device 120 in order for the second device 120 to determine its location. Hence, according to an embodiment the second device 120 is configured to, in a step S214, transmit a positioning ranging request to the first device 110. It is assumed that the first device 110 receives and responds to the ranging request. Hence, according to this embodiment the second device 120 is configured to, in a step S216, receive a positioning ranging response from the first device 110 in response to having transmitted the request in step S214 to enable estimation of the range to the first device 110.

There may be different ways for the second device 120 to communicate with the network node 140, the radio network nodes 130a, 130b, and the first device 110, respectively. Different examples relating thereto will now be described in turn.

For example, all messages between the second device 120 and the network node 140 may be control plane messages or user plane positioning protocol messages. Examples of such protocols are LPP, and SUPL.

For example, all messages between the second device 120 and the radio network nodes 130a, 130b may be RRC protocol messages or MAC protocol messages.

For example, as noted above, all messages between the first device 110 and the second device 120 may be sidelink protocol messages.

Figure 9:
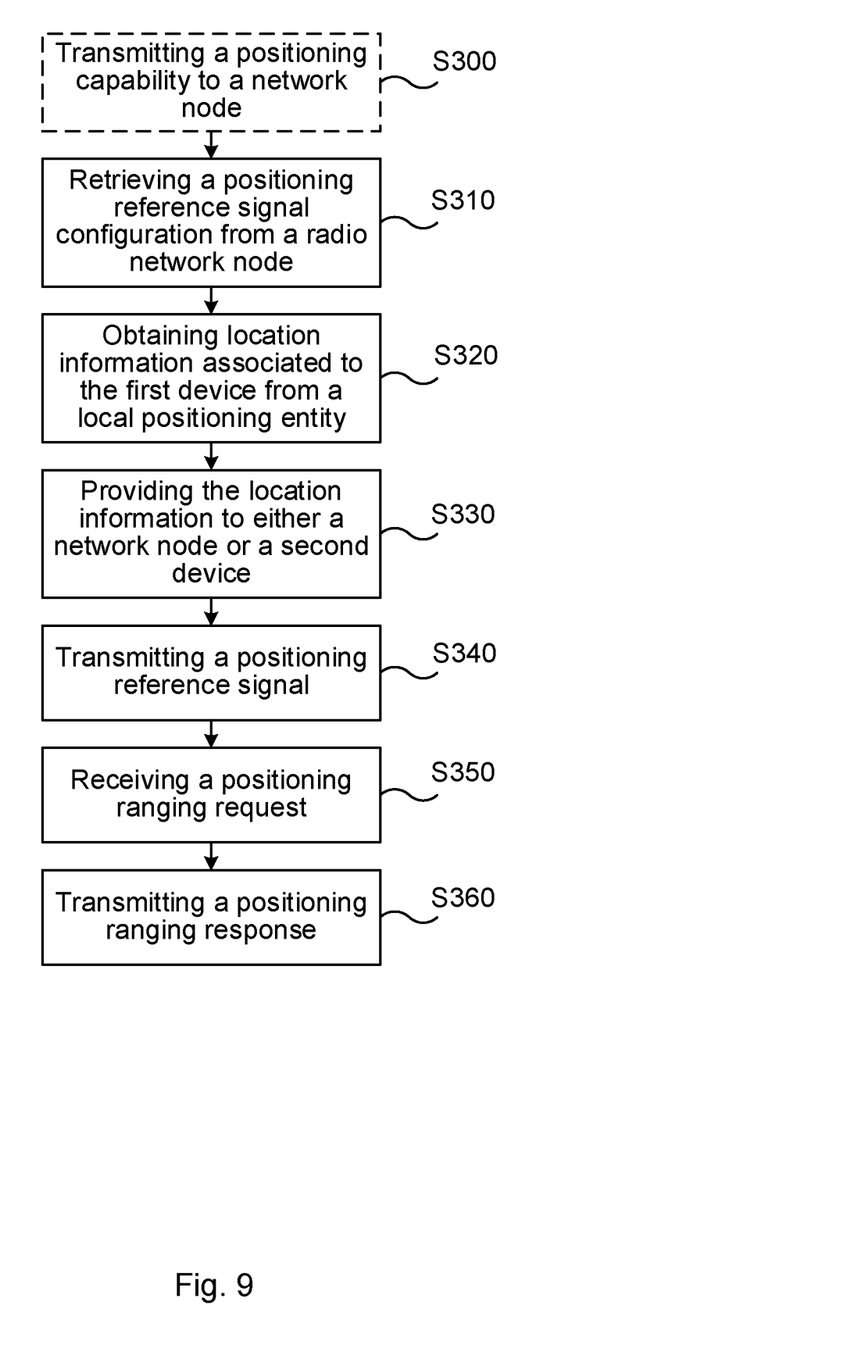
Figure 11:
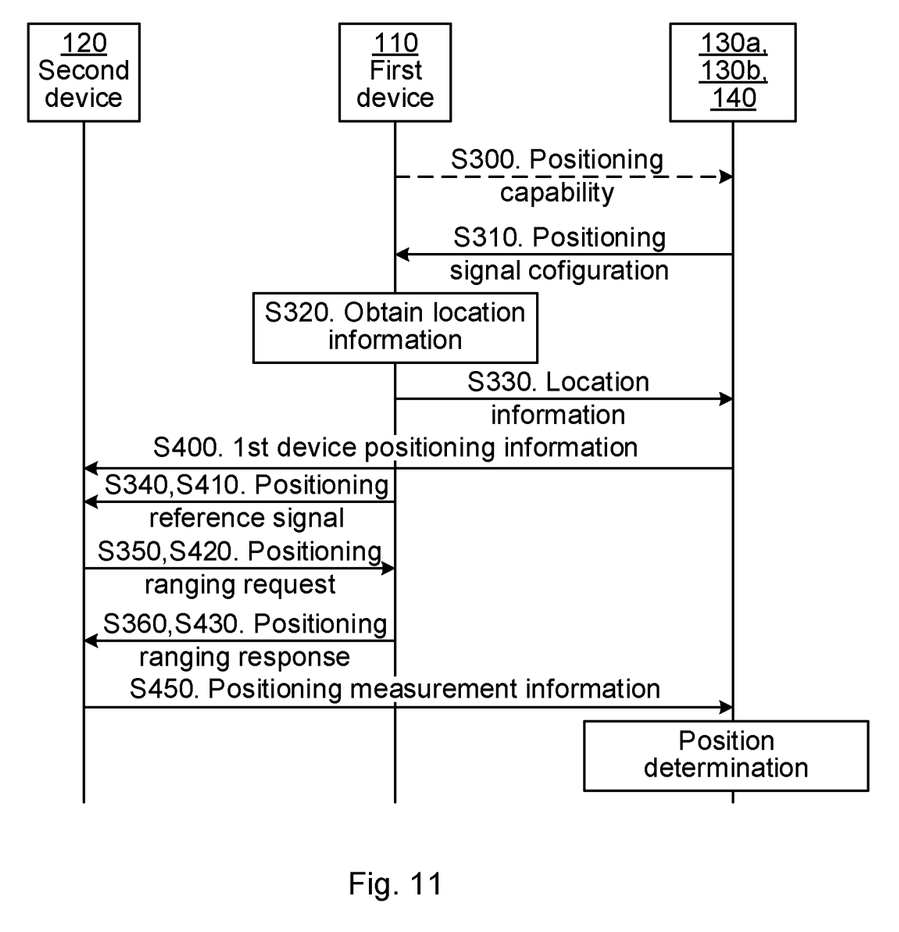
FIGS. 11 and 12 are signalling diagrams according to embodiments.
Figure 12:
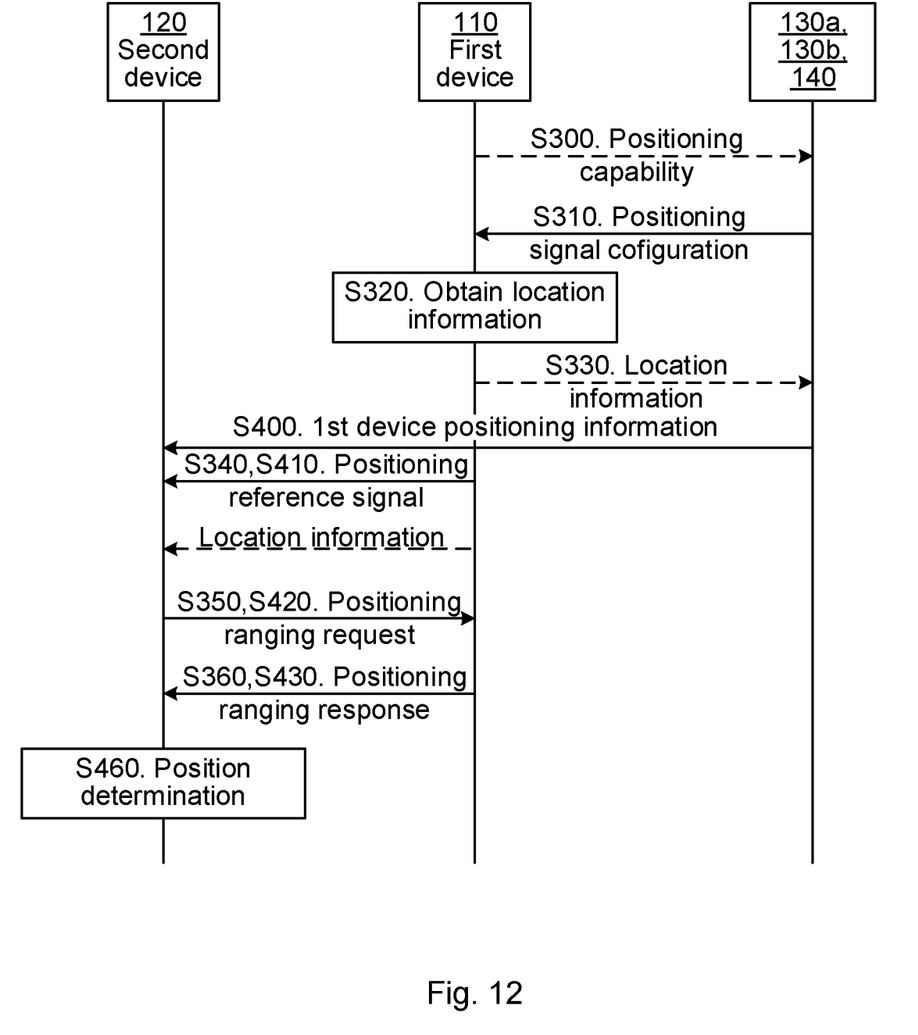

A particular embodiment for providing positioning information in a communications network 100 based on at least some of the above disclosed embodiments will now be disclosed in detail with references to the flowchart of FIG. 9 and the signalling diagrams of FIGS. 11 and 12.

S300 (optional): The first device 110 signals its positioning support capability to a network node. One way to implement step S300 is to perform step S112.

S310: The network node 400 configures positioning reference signals for the first device 110. One way to implement step S310 is to perform step S102.

S320: The first device 110 obtains location information about its own location. The device capability for self-localization can be provided as part of step S300. One way to implement step S320 is to perform step S104.

S330: The determined location information may be provided to the network node. An alternative is that the first device 110 initially obtains its location information and provides the location information as part of the positioning support capability information in step S300. It may even trigger the signaling of the provision support capability message when adequate self-localization has been achieved. Yet another alternative is that the location information is provided directly to the second device 120 as FIG. 12. The latter has the advantage that the time obtaining the location information by the first device 110 to the time when the second device 120 receives the location information is short, thereby enabling considering mobile first devices at higher velocities compared to if the location information would be sent via a network node. One way to implement step S330 is to perform step S106.

S340: The first device 110 transmits a positioning reference signal according to the positioning reference signal configuration. One way to implement step S340 is to perform step S108.

S350: The first device 110 receives a positioning ranging request from the second device 120. One way to implement step S350 is to perform step S122.

S5360: The first device 110 responds to the positioning ranging request to the second device 120. One way to implement step S360 is to perform step S124.

Figure 10:
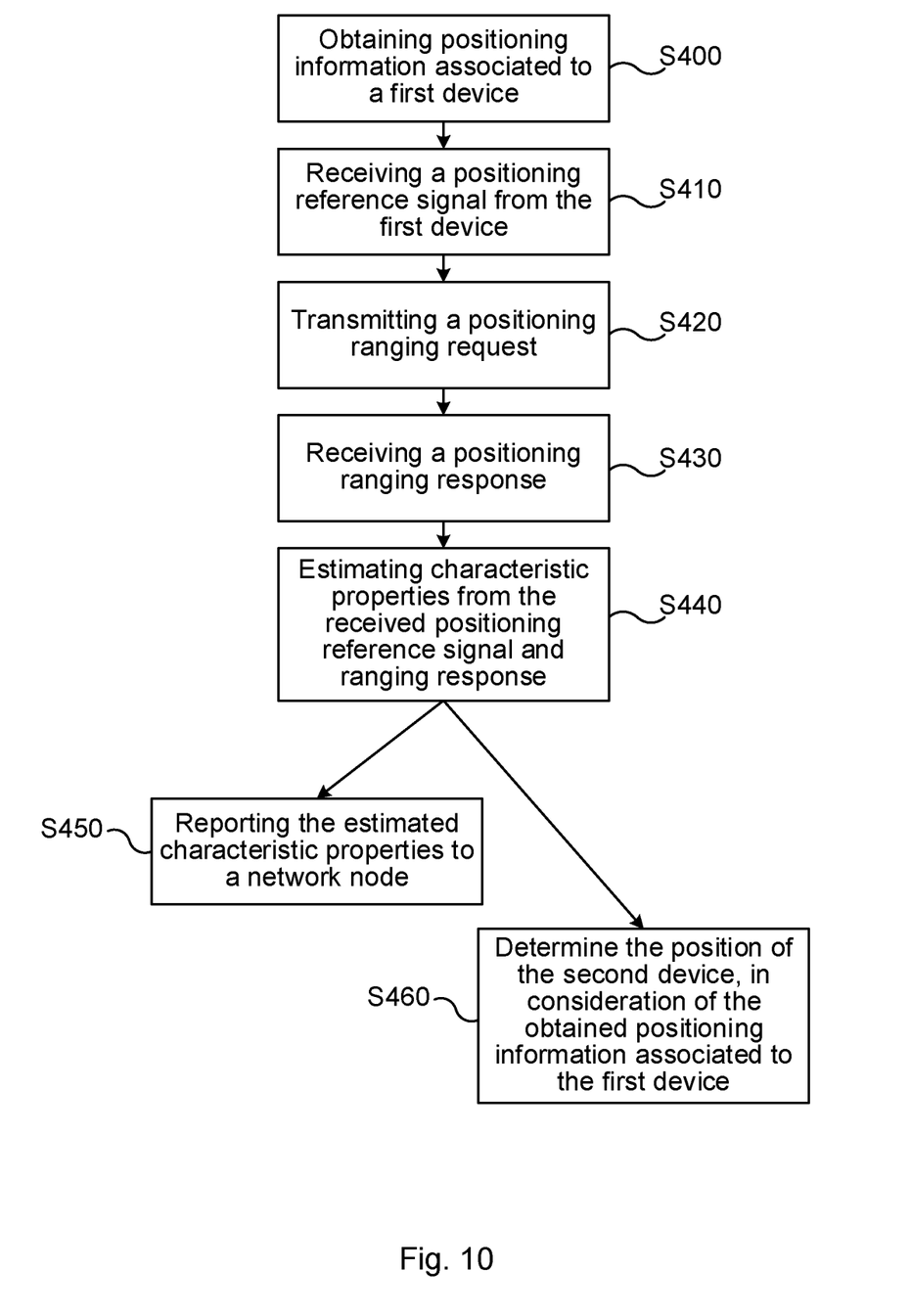

A particular embodiment for obtaining positioning information in a communications network 100 based on at least some of the above disclosed embodiments will now be disclosed in detail with references to the flowchart of FIG. 10 and the signalling diagrams of FIGS. 11 and 12.

S400: The second device 120 obtains positioning information associated to the first device 110. Thereby, the second device 120 is able to detect and analyze a positioning reference signal from the first device (as in step S410 below), as well as receiving and decoding optional signaling of first device location information. One way to implement step S400 is to perform step S02.

S410: The second device 120 receives a positioning reference signal from the first device 110. One way to implement step S410 is to perform step S206.

S420: The second device 120 initiates a transmission of a positioning ranging request to the first device 110. One way to implement step S420 is to perform step S214.

S430: The second device 120 receives a positioning ranging response from the first device 110, and is able to estimate the range to the first device 110 based on the time the request was transmitted, and the estimated time of arrival of the response, in consideration of the needed processing time in the first device 110. One way to implement step S430 is to perform step S216.

S440: The second device 120 estimates characteristic properties from the received positioning reference signal. One way to implement step S440 is to perform step S208.

S450: The second device 120 reports the estimated characteristic properties and an association thereof with the first device 110 to a network node in the communications network 100 One way to implement step S450 is to perform step S210.

S460: The second device 120 uses the received and estimated information to estimate the position of the second device 120. One way to implement step S460 is to perform step S212. Once the position of the second device 120 has been estimated, the position estimate may be signaled to the network node, or to some other entity in the communications network 100.

Positioning reference signals defined for LTE, separated in a sequence and a resource mapping in 3GPP TS 36.211 will now be disclosed in more detail. The positioning signal reference sequence is based on a pseudo-random sequence defined by a length 31 Gold sequence. Particularly, the output sequence $c(n)$ of length $M_{PN}$, where $n=0,1,\ldots,M_{PN}-1$, is defined by $$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where $N_C=1600$ and the first m-sequence shall be initialized with $x_1(0)=1, x_1(n)=0, n=1,2,\ldots,30$. The initialization of the second m-sequence is denoted by $c_{init}=\sum_{i=0}^{30} x_2(i)\cdot 2^i$ with the value depending on the application of the sequence.

The reference signal sequence $r_{l,n_s}(m)$ is defined by $$r_{l,n_s}(m) = \frac{1}{\sqrt{2}}(1-2\cdot c(2m)) + j\frac{1}{\sqrt{2}}(1-2\cdot c(2m+1)),$$

$$m = 0, 1, \ldots, 2N_{RB}^{max,DL}-1$$

where $n_s$ is the slot number within a radio frame, l is the OFDM symbol number within the slot, where OFDM is short for orthogonal frequency-division multiplexing. The pseudo-random sequence $c(i)$ is defined in Section 7.2 of 3GPP TS 36.211. The pseudo-random sequence generator is initialized with $c_{init}=2^{10}\cdot(7\cdot(n_s+1)+l+1)\cdot(2\cdot N_{ID}^{cell}+1)+2\cdot N_{ID}^{cell}+N_{CP})$ at the start of each OFDM symbol where $$N_{CP} = \begin{cases} 1 & \text{for normal } CP \\ 0 & \text{for extended } CP \end{cases}$$

where CP is short for cyclic prefix. In addition, the mapping to resource elements (only shown for normal cyclic prefix) is given by Section 7.2 of 3GPP TS 36.211. The reference signal sequence $r_{l,n_s}(m)$ is mapped to complex-valued modulation symbols $a_{k,l}^{(p)}$ used as reference signal for antenna port p=6 in slot $n_s$ according to $$a_{k,l}^{(p)} = r_{l,n_s}(m')$$

where for normal cyclic prefix:

$$k = 6(m + N_{RB}^{DL} - N_{RB}^{PRS}) + (6 - l + v_{shift})\bmod 6$$

$$l = \begin{cases} 3, 5, 6 & \text{if } n_s \rightleftarrows \bmod 2 = 0 \\ 1, 2, 3, 5, 6 & \text{if } n_s \rightleftarrows \bmod 2 = 1 \text{ and } (1 \text{ or } 2 \text{ } PBCH antenna \text{ ports}) \\ 2, 3, 5, 6 & \text{if } n_s \rightleftarrows \bmod 2 = 1 \text{ and } (4 \text{ } PBCH antenna \text{ ports}) \end{cases}$$

$$m = 0, 1, \ldots, 2\cdot N_{RB}^{PRS} - 1$$

$$m' = m + N_{RB}^{max,DL} - N_{RB}^{PRS}$$

The bandwidth for positioning reference signals $N_{RB}^{PRS}$ is configured by higher layers and the cell-specific frequency shift is given by $v_{shift}=N_{ID}^{cell} \bmod 6$.

In summary, according to some embodiments there has been disclosed a method according to which, optionally, the first device 110 provides its specific capability of supporting positioning to a network node. When/if the network node identifies the need for positioning support, it configures one of more first devices 110. Thus, the first device 110 receives a positioning reference signal configuration from the network node. The first device 110 also retrieves its own location. The first device 110 sends the location information to either a network node or a second device, and transmits a positioning reference signal. According to some embodiments there has been disclosed a method according to which a second device 120 obtains positioning assistance information related to the first device 110, and receives a positioning reference signal from the first device 110. After estimating characteristic properties of the received signal, the second device 120 selects, based on configuration, if it either shall report the estimated characteristics to a network node, or to determine its position in consideration of the received information and estimate characteristics.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A method performed by a mobile station operating in a communications network, the method comprising:
   determining whether the mobile station is self-localized; and
   responsive to determining that the mobile station is self-localized:
   sending a capability indication to a network node of the communications network, indicating that the mobile station is operative to transmit positioning reference signals (PRSs) for use by other mobile stations in determining their locations relative to the mobile station;
   receiving configuration information from the network node of the communication network, the configuration information sent in dependence on the capability indication and indicating a PRS configuration; and
   transmitting a PRS according to the PRS configuration, for positioning measurements by the other mobile stations.

2. The method of claim 1, wherein the capability indication indicates PRS configurations supported by the mobile station.

3. The method of claim 1, wherein determining whether the mobile station is self-localized comprises determining whether a local positioning entity of the mobile station has determined a current location of the mobile station, based on receiving signals from a Global Navigation Satellite System (GNSS).

4. The method of claim 1, wherein transmitting the PRS according to the PRS configuration comprises at least one of: transmitting, as the PRS, a sequence indicated by the PRS configuration, or transmitting the PRS on radio resources indicated by the PRS configuration.

5. The method of claim 1, further comprising the mobile station transmitting information indicating a current location of the mobile station, for reception by the other mobile stations or for reception by the network node of the communications network.

6. The method of claim 1, wherein transmitting the PRS comprises transmitting the PRS responsive to receiving a ranging request from one or more of the other mobile stations.

7. The method of claim 1, wherein determining whether the mobile station is self-localized comprises determining whether a local positioning entity within the mobile station is providing current location information for the mobile station.

8. The method of claim 1, wherein determining whether the mobile station is self-localized further comprises determining whether the mobile station is stationary, or wherein sending the capability indication to the network node of the communications network includes indicating whether the mobile station is stationary.

9. A mobile station configured for operating in a communications network, the mobile station comprising:
   a communication interface; and
   processing circuitry operatively associated with the communication interface for sending and receiving signaling or other information and configured to:
   determine whether the mobile station is self-localized; and
   responsive to determining that the mobile station is self-localized:
   send a capability indication to a network node of the communications network, indicating that the mobile station is operative to transmit positioning reference signals (PRSs) for use by other mobile stations in determining their locations relative to the mobile station;
   receive configuration information from the network node of the communication network, the configuration information sent in dependence on the capability indication and indicating a PRS configuration; and
   transmit a PRS according to the PRS configuration for positioning measurements by the other mobile stations.

10. The mobile station of claim 9, wherein the capability indication indicates PRS configurations supported by the mobile station.

11. The mobile station of claim 9, wherein the processing circuitry is configured to determine whether the mobile station is self-localized based on determining whether a local positioning entity of the mobile station has determined a current location of the mobile stations, based on receiving signals from a Global Navigation Satellite System (GNSS).

12. The mobile station of claim 9, wherein, for transmitting the PRS according to the PRS configuration, the processing circuitry is configured to perform at least one of: transmitting, as the PRS, a sequence indicated by the PRS configuration, or transmitting the PRS on radio resources indicated by the PRS configuration.

13. The mobile station of claim 9, wherein the processing circuitry is configured to transmit, via the communication interface, information indicating a current location of the mobile station, for reception by the other mobile stations or for reception by the network node of the communications network.

14. The mobile station of claim 9, wherein the processing circuitry is configured to transmit the PRS via the communication interface, in response to receiving a ranging request from one or more of the other mobile stations.

15. The mobile station of claim 9, wherein the processing circuitry is configured to determine whether the mobile station is self-localized by determining whether a local positioning entity within the mobile station is providing current location information for the mobile station.

16. The mobile station of claim 9, wherein, to determine whether the mobile station is self-localized, the processing circuitry is configured to determine whether the mobile station is stationary, or wherein, for sending the capability indication to the network node of the communications network, the processing circuitry is configured to include an indication of whether the mobile station is stationary.

* * * * *

UNITED STATES PATENT AND TRADEMARK OFFICE
CERTIFICATE OF CORRECTION

PATENT NO. : 11,051,271 B2  
APPLICATION NO. : 16/924558  
DATED : June 29, 2021  
INVENTOR(S) : Gunnarsson et al.

Page 1 of 1

It is certified that error appears in the above-identified patent and that said Letters Patent is hereby corrected as shown below:

In the Specification

In Column 9, Line 38, delete "Global Navigation Satellite System (GLONAS)," and insert -- Global Navigation Satellite System (GLONASS), --, therefor.

In Column 13, Lines 29-31, delete " $\hat{p} = \underset{p}{\text{argmin}} \sum_k (y_k - h(p, p_k))^2$ " and insert -- $\hat{p} = \underset{p}{\arg\min} \sum_k (y_k - h(p, p_k))^2$ --, therefor.

In Column 15, Line 4, delete "S5360:" and insert -- S360: --, therefor.

In Column 16, Lines 13-14, delete "$c_{init}=2^{10} \cdot (7 \cdot (n_s+1)+1+1) \cdot (2 \cdot N_{ID}^{cell}+1)+2 \cdot N_{ID}^{cell}+N_{CP}$)" and insert -- $c_{init}=2^{10} \cdot (7 \cdot (n_s+1)+1+1) \cdot (2 \cdot N_{ID}^{cell}+1)+2 \cdot N_{ID}^{cell}+N_{CP}$ --, therefor.

In Column 16, Line 50, delete "of more" and insert -- or more --, therefor.

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*